United States Patent Office
3,819,653
Patented June 25, 1974

3,819,653
METHOD FOR PREPARING OXAZIRIDINES
Jean-Pierre Schirmann, Brignais, and Francis Weiss, Pierre-Benite, France, assignors to Produits Chimiques Ugine Kuhlmann, Paris, France
No Drawing. Filed Oct. 28, 1971, Ser. No. 193,564
Claims priority, application France, Oct. 30, 1970, 7039204
Int. Cl. C07d 1/00
U.S. Cl. 260—333
10 Claims

ABSTRACT OF THE DISCLOSURE

This invention relates to a method for preparing oxaziridines of the general formula

(I)

wherein $R_1$ and $R_2$ each is a hydrogen atom, or a non-substituted or substituted linear or branched alkyl or cycloalkyl radical having a maximum of 10 carbon atoms, or a non-substituted or substituted phenyl radical, substitution being with one or more groups which are stable under the conditions of the reaction whereby said oxaziridines (I) are produced or $R_1$ and $R_2$ together is a linear or branched alkylene radical of from 3 to 11 carbon atoms which comprises reacting an imine of the general formula

(II)

with hydrogen peroxide and a nitrile of the general formula $$R_4\text{—CN} \quad (III)$$

wherein $R_1$ and $R_2$ have the aforesaid meaning and $R_3$ and $R_4$ each is a non-substituted or substituted linear or branched alkyl or cycloalkyl radical having a maximum of 10 carbon atoms or a non-substituted or substituted phenyl radical, substitution being with one or more groups which are stable under the conditions whereby said oxaziridines (I) are produced and recovering said oxaziridines (I) from the reaction medium.

BACKGROUND OF THE INVENTION (I) Field of the invention

This invention relates to a method for preparing oxaziridines of the general formula

(I)

which comprises reacting an imine of the general formula

(II)

with hydrogen peroxide and a nitrile $$R_4\text{—CN} \quad (III)$$

wherein $R_1$, $R_2$, $R_3$ and $R_4$ each has the above-designated meaning and recovering the oxaziridine (I) from the reaction medium.

(II) Description of the prior art

The current methods for synthesizing oxaziridines require the use of uncommon, hence expensive, reactants or the use of relatively severe reaction conditions. For example, it has been proposed to epoxidate the corresponding imines using a carboxylic peracid in an anhydrous medium in a solvent such as ether, benzene or methylene chloride (German Pat. Nos. 952,895 and 959,094) or to react a ketone with an N-substituted chloroamine (Ber. 1965, 98, 2516) or with o-hydroxylaminesulfonic acid (Angew. Chem., 1961, 73, 708). It has also been suggested to react a solution of anhydrous hydrogen peroxide in ether with an imine in order to form an aminohydroperoxide which is then heated for dehydration to an oxaziridine (Angew. Chem., 1965, 70, 548).

SUMMARY OF THE INVENTION

Applicants have discovered that oxaziridines of the general formula

(I)

wherein $R_1$ and $R_2$ each is a hydrogen atom or a non-substituted or substituted linear or branched alkyl or cycloalkyl radical having a maximum of 10 carbon atoms, a non-substituted or substituted phenyl radical, substitution being with one or more groups which are stable under the conditions of the reaction whereby said oxaziridines (I) are produced or $R_1$ and $R_2$ together is a linear or branched alkylene radical of from 3 to 11 carbon atoms are conveniently prepared in good yields by reacting an imine of the general formula

(II)

with hydrogen peroxide and a nitrile of the general formula $$R_4\text{—CN} \quad (III)$$

wherein $R_1$ and $R_2$ have the aforesaid meaning and $R_3$ and $R_4$ each is a non-substituted or substituted linear or branched alkyl or cycloalkyl radical having a maximum of 10 carbon atoms or a non-substituted or substituted phenyl radical, substitution being with one or more groups which are stable under the conditions whereby said oxaziridines (I) are produced and recovering said oxaziridines (I) from the reaction medium.

DESCRIPTION OF THE PREFERRED EMBODIMENTS

Radicals $R_1$ and $R_2$ can be substituted with groups which are stable in the reaction medium whereby oxaziridines (I) are produced; examples of such stable groups include methyl, methoxy, chloro, bromo, fluoro and nitro groups. Other groups may be employed as is readily apparent to one skilled in the art.

It is advantageous to react the imine (II), hydrogen peroxide and nitrile (III) in aqueous medium or in the presence of an organic solvent inert with respect to the reaction components in order to facilitate homogenization of the reaction mixture.

Examples of solvents which may be employed in the process of this invention include the aliphatic monoalcohols having less than four carbon atoms which include methanol, ethanol, n-propanol, isopropanol, n-butanol, sec-butanol, isobutanol and tert-butanol.

It is advantageous to carry out the reaction at a temperature from about 0° C. to 100° C. The reaction can be made to take place under atmospheric pressure, or if desired, at a pressure up to 10 atmospheres to maintain all the reactions in the liquid reaction medium.

The reactants can be used in equimolar quantity or one can use more of, or less then, one or another of the reactants. For example, from 0.2 to 5 moles imine (II) per mole of hydrogen peroxide can be reacted. The nitrile according to formula (III) is advantageously employed in a molar quantity which is equal to, or greater than, the hydrogen peroxide, for example, 1 to 10 moles nitrile (III) per mole of hydrogen peroxide.

It is advantageous to employ hydrogen peroxide as a 30–90% by weight aqueous solution such as supplied commercially.

It is advantageous to add one or more hydrogen peroxide stabilizing agents to the reaction medium or agents capable of buffering the pH of the reaction medium such as phosphoric acid, nitrilotriacetic acid, ethylenediaminetetraacetic acid, acetic acid or the alkaline metal or ammonium salts of such acids at a level of about 0.01 to 1.0% by weight of the reaction medium for each of these agents.

The oxaziridines (I) can be separated from the reaction medium using known and conventional methods, as for example, extraction with an immiscible solvent, fractional distillation or a combination of these two methods.

The oxaziridines (I) of this invention are useful as intermediates for the synthesis of lactams such as the N-substituted lactams, for example.

The following examples are illustrative of the process of this invention.

EXAMPLE 1

89.5 gm. (0.5 moles) cyclohexylidene cyclohexylamine, 20.5 gm. (0.5 moles) acetonitrile and 160 gm. methanol were charged into a reactor having a volume of 750 ml. The reaction mixture was heated to 40° C. and then over a period of 1 hour, 26.7 gm. of a 70% by weight aqueous solution of hydrogen peroxide (0.55 moles) were added. The medium was left to react for 3 hours and then methanol was removed therefrom under a pressure of 200 mm. Hg. 100 cm.³ water were then added to the residue and a first extraction with 100 cm.³ water was followed by two additional extractions each with 50 cm.³ chloroform. The organic layers were combined, washed with 50 cm.³ water and dried upon a bed of anhydrous N₂SO₄. The chloroform was withdrawn under vacuum. Distillation of the residue provided 72 gm. (74% yield) of pentamethylene-N-cyclohexyloxaziridine (boiling point of 87° C.–88° C. at 0.2 mm. Hg) of the formula

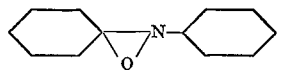

identified by infra-red and mass spectrometry. The physical and spectral characteristics agree with those reported in the literature (cf. H. Krimm, Ber., *91*, 1057 (1958)); the absorption band characteristic of the cyclic group

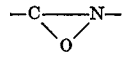

being 1398 cm.⁻¹

EXAMPLE 2

30 gm. (0.236 moles) isobutylidene sec-butylamine, 75 gm. methanol, 27 gm. (0.236 moles) benzonitrile and 0.5 cm.³ 1.0 N NaOH were successively charged into a reactor. 12.6 gm. of 70% by weight (0.260 moles) hydrogen peroxide were then added drop by drop over a period of 30 minutes at ambient temperature (25° C.). After 3 hours and 30 minutes of reaction time, the methanol was evaporated, 50 ml. water were then added to the residue and extraction was carried out using 100 cm.³ chloroform. The organic layer was washed with 25 cm.³ water and dried upon a bed of anhydrous Na₂SO₄. The chloroform was withdrawn by evaporation and upon distillation, 16.3 gm. (48.5% yield) isopropyl-N-sec butyloxaziridine (boiling point of 42° C. at 0.3 mm. Hg) of the formula

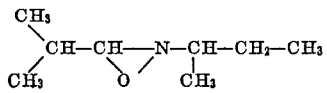

was recovered having an absorption band characteristic of the cyclic group

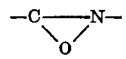

of 1380 cm.⁻¹.

EXAMPLE 3

The procedure similar to that set forth in Example 2 was carried out except that benzonitrile was replaced by 9.6 gm. (0.236 moles) acetonitrile. Distillation under vacuum resulted in 16.2 gm. (48% yield) isopropyl-N-secbutyloxaziridine.

EXAMPLE 4

16.6 gm. of 70% by weight aqueous of a solution (0.341 moles) of hydrogen peroxide were added drop by drop at ambient temperature to a mixture of 35 gm. (0.31 moles) isobutylidene isopropylamine, 35.1 gm. (0.341 moles) benzonitrile, 99.2 gm. methanol and 0.6 cm.³ 1.0 N NaOH. After reacting for three hours, the methanol was evaporated, 50 cm.³ water were added to the residue and extraction was carried out using chloroform. The organic layer was washed with water, dried upon a bed of anhydrous Na₂SO₄ and the solvent was removed by evaporation. The residue was subjected to vacuum distillation and 18.4 gm. of 2,3-diisopropyloxaziridine (also named isopropyl-N-isopropyloxaziridine) having a boiling point of 43° C.–45° C. at 1.2 mm. Hg and the formula

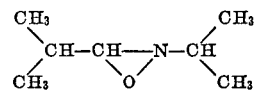

were recovered. The compound has the absorption band characteristic of the cyclic group

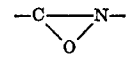

of 1370 cm.⁻¹.

EXAMPLE 5

30.6 gm. (0.2 moles) isobutylidene cyclohexylamine, 20.6 gm. benzonitrile (0.2 moles) and 64 gm. methanol were successively charged into a reactor having a volume of 250 cm.³. The reaction medium was heated to 40° C. and then, over a period of 30 minutes, 9.7 gm. (0.2 moles) of a 70% by weight aqueous solution of hydrogen peroxide was added. After reacting for five hours, the methanol was removed under vacuum and the residue was subjected to extraction with chloroform. The organic phase was washed with water and dried upon a bed of anhydrous Na₂SO₄. After withdrawal of the solvent, 17.2 gm. of 2-cyclohexyl-3-isopropyloxaziridine (having a boiling point of 42° C. at 0.2 mm. Hg) and an absorption band characteristic of the cyclic group

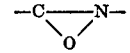

at 1370 cm.⁻¹ were recovered.

We claim:

1. A method for preparing oxaziridines of the general formula:

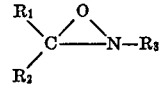

wherein $R_1$ and $R_2$ each is a hydrogen atom, a non-substituted $C_1$–$C_{10}$ alkyl, or non-substituted cycloalkyl radical having a maximum of 10 carbon atoms, or a non-substitituted phenyl radical, or a substituted $C_1$–$C_{10}$ alkyl, or a substituted cycloalkyl having a maximum of 10 carbon atoms, or a substituted phenyl radical, said substitution being with one or more groups which are stable under the conditions of the reaction whereby said oxaziridines (I) are produced, or $R_1$ and $R_2$ together is an alkylene radical of from 3 to 11 carbon atoms which comprises reacting an imine of the general formula

with hydrogen peroxide and a nitrile in at least equal molar quantities to said peroxide of the general formula $$R_4\text{—}CN \qquad (III)$$

wherein $R_1$ and $R_2$ have the aforesaid meaning and $R_3$ and $R_0$ each is a non-substituted $C_1$–$C_{10}$ alkyl or a non-substituted cycloalkyl radical having a maximum of 10 carbon atoms or a non-substituted phenyl radical, or a substituted $C_1$–$C_{10}$ alkyl or a substituted cycloalkyl having a maximum of 10 carbon atoms or a substituted phenyl said substitution being with 1 or more groups which are stable under the conditions whereby said oxaziridines (I) are produced and recovering said oxaziridines (I) from the reaction medium.

2. The method of claim 1 wherein substitution is with a methyl, methoxy, chloro, bromo, fluoro or nitro group.

3. The method of claim 1 wherein imine (II), hydrogen peroxide and nitrile (III) are reacted with aqueous medium or in an organic solvent which is inert with respect to the reaction components.

4. The method of claim 3 wherein the organic solvent is an aliphatic monoalcohol having not more than four carbon atoms.

5. The method of claim 1 wherein the reaction temperature is in the range from about 0° C. to 100° C.

6. The method of claim 1 wherein the reaction pressure is less than, the same as or up to about 10 times greater than atmospheric pressure.

7. The process of claim 1 wherein imine (II), hydrogen peroxide and nitrile (III) are present in approximately equimolar amounts.

8. The process of claim 1 wherein from about 0.2 to 5 moles imiine (II) per mole of hydrogen peroxide are reacted.

9. The process of claim 1 wherein from about 1 to 10 moles nitrile (III) per mole of hydrogen peroxide are reacted.

10. The process of claim 1 wherein from about 0.01 to 1.0% of a hydrogen peroxide stabilizing agent or a buffering agent by weight of the reaction medium is added.

References Cited

UNITED STATES PATENTS 2,784,182    3/1957    Krimm et al. _____ 260—239

OTHER REFERENCES

Emmons, W. D.: "The Preparation and Properties of Oxiziranes," J. Chem. Soc., 1957, pp. 5739–54.

HENRY R. JILES, Primary Examiner

M. A. M. CROWDER, Assistant Examiner

UNITED STATES PATENT OFFICE
CERTIFICATE OF CORRECTION

Patent No. 3,819,653　　　　　　　　　Dated June 25, 1974

Inventor(s) Jean-Pierre Schirmann and Francis Weiss

It is certified that error appears in the above-identified patent and that said Letters Patent are hereby corrected as shown below:

1. In column 1, line 30, " 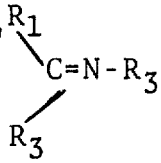 " should read $$-- \begin{array}{c} R_1 \\ \diagdown \\ C = N - R_3 \\ \diagup \\ R_2 \end{array} --.$$

2. In column 1, line 57, " 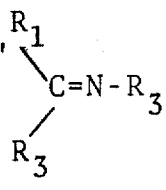 " should read $$-- \begin{array}{c} R_1 \\ \diagdown \\ C = N - R_3 \\ \diagup \\ R_2 \end{array} --.$$

3. In column 2, line 68, "all the reactions" should read -- all the reactants --.

4. In column 5, line 5, " 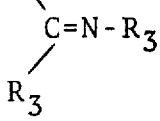 " should read $$-- \begin{array}{c} R_1 \\ \diagdown \\ C = N - R_3 \\ \diagup \\ R_2 \end{array} --.$$

5. In column 5, line 12, "$R_3$ and $R_o$" should read -- $R_3$ and $R_4$ --.

Signed and sealed this 29th day of October 1974.

(SEAL)
Attest:

McCOY M. GIBSON JR.　　　　　　　　　C. MARSHALL DANN
Attesting Officer　　　　　　　　　　　Commissioner of Patents